United States Patent [19]
Alvarez

[11] Patent Number: 4,948,137
[45] Date of Patent: Aug. 14, 1990

[54] TETHERED PLAYING DEVICE

[76] Inventor: Marcial Alvarez, 357 Sycamore St., Rahway, N.J. 07065

[21] Appl. No.: 354,381

[22] Filed: May 19, 1989

[51] Int. Cl.⁵ .................. A63B 69/22; A01K 50/02
[52] U.S. Cl. .................................... 273/413; 119/29
[58] Field of Search ............... 119/29; 273/58 C, 413, 273/414

[56] References Cited

U.S. PATENT DOCUMENTS 3,924,855 12/1975 Pretorius .......................... 273/413
4,342,459 8/1982 Pretorius .......................... 273/413
4,523,762 6/1985 Garner, Sr. .................. 273/58 C X

FOREIGN PATENT DOCUMENTS 876557 11/1942 France .............................. 273/413
297660 9/1928 United Kingdom ............ 273/413

Primary Examiner—Robert P. Swiatek
Assistant Examiner—Todd E. Manahan
Attorney, Agent, or Firm—Klauber & Jackson

[57] ABSTRACT

A tethered playing device for exercising dogs is provided, which includes a tethered line and a ball releasably suspended from the line. A handle is provided to manipulate the line to cause the ball to move. The dog jumps around and receives strenuous exercise in chasing the moving ball.

5 Claims, 1 Drawing Sheet

TETHERED PLAYING DEVICE

FIELD OF THE INVENTION

The present invention relates to a tethered ball used for exercising and playing with dogs.

BACKGROUND OF THE INVENTION

Devices for exercising animals are well known. However, the prior devices are either complex or costly and are difficult to install or use.

It is thus an object of the present invention to provide a playing device which is simple to install and use and is inexpensive.

SUMMARY OF THE INVENTION

In accordance with the present invention, there is provided a tethered line adapted to be supported at each end, on a tree or the like. A playing ball is releasably suspended from the line, and a handle is connected to the line so that it may be manipulated.

In operation, the handle is pulled up and down and sideways, and this causes the tethered line and ball to move in all directions. The dog jumps in all directions to hit the ball and receives strenuous exercise as a result.

DETAILED DESCRIPTION OF PREFERRED EMBODIMENT

Figure 1:
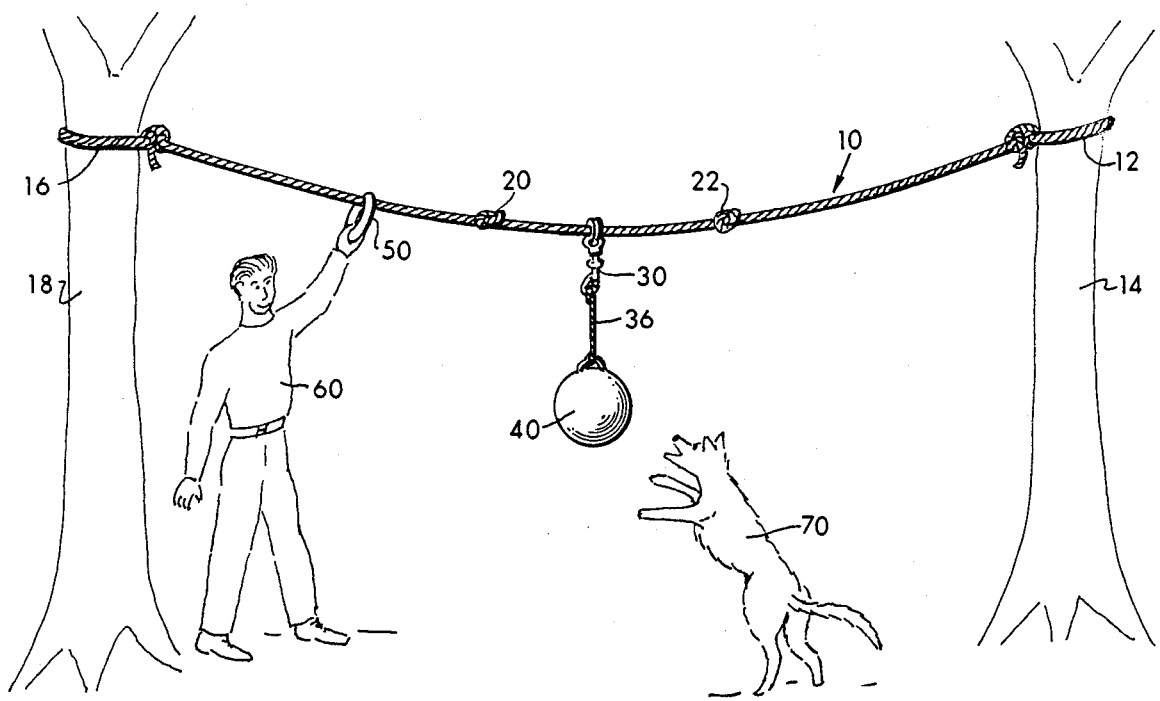
FIG. 1 illustrates the device of the present invention.
Figure 2:
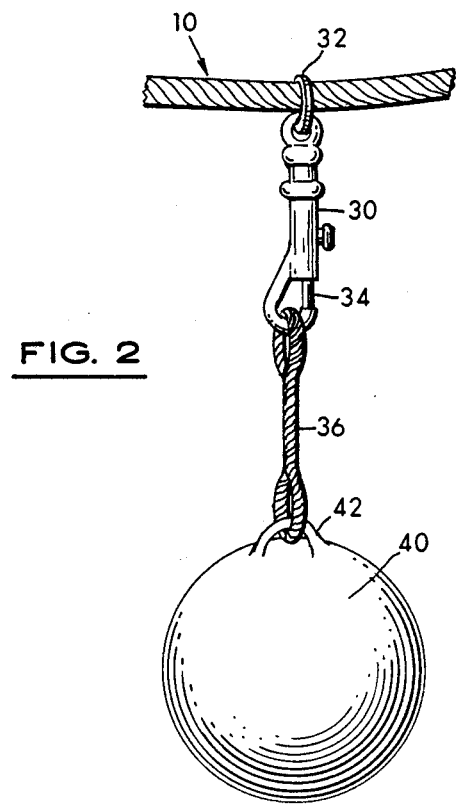
FIG. 2 shows in detail the support and attachment mechanism for connecting the ball to the tethered line.

In FIG. 1, there is shown a tethered line 10 having a first end 12 tied to a tree 14 and a second end 16 tied to a tree 18. The tethered line 10 includes spaced-apart stops 20 and 22 formed thereon. The stops can be knots or other devices connected to the tethered line 10, for a purpose to be explained.

A releasable latch 30 is disposed on tethered line 10 by a ring 32 or other suitable device, so that it can move along line 10, and includes a holder 34 to which is connected a line 36. Holder 34 has a release, so that line 36 can be releasably connected to it and line 10.

Line 36 is connected to a playing ball 40 by suitable means 42.

A handle 50 is connected to line 10 to manipulate the line 10 and playing ball 40.

In operation, the ball 40 and line 36 are connected to latch 30. The operator 60 moves the handle 50 in all directions to move the line 10 in all directions. As a result, the ball 40 is moved up and down and also sideways. The dog 70 jumps up and down to try and hit or catch the ball 40, and the dog receives strenuous exercise in a short time. Stops 20 and 22 prevent latch 30 from moving too far in either direction along line 10.

Advantageously, there has been provided in accordance with the present invention a simple and inexpensive exercise device for dogs. The ball may be disconnected when not in use or in bad weather. The device is also simple to install.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A tethered playing device, comprising:
   a tethered line having ends connectible to spaced uprights to thereby define a fixed piece of said line between the uprights when said line is connected to said uprights;
   a playing ball;
   means for supporting said playing ball on said tethered line; and
   elongated means attached to said line between said ends and extending outwardly from said line for manually manipulating said tethered line to move said playing ball.

2. A tethered device in accordance with claim 1, wherein said supporting means includes a releasable latch for detaching said playing ball from said tethered line.

3. A tethered device in accordance with claim 1, wherein said manipulating means between said ends includes an outwardly-extending elongated handle for grasping with a hand and connected to said tethered line.

4. A tethered device in accordance with claim 1, wherein said tethered line includes means for attaching said tethered line to holding means at or near the ends of said tethered line.

5. A tethered device in accordance with claim 1, further including stops located on said tethered line to restrict the movement of said supporting means and said playing ball along said tethered line.

* * * * *